United States Patent
Long et al.

(10) Patent No.: US 12,466,778 B2
(45) Date of Patent: Nov. 11, 2025

(54) CATALYSTS FOR ISOBUTANOL SYNTHESIS FROM SYNGAS AND ETHANOL OR PROPANOL

(71) Applicants: UOP LLC, Des Plaines, IL (US); CHINA PETROLEUM & CHEMICAL CORPORATION, Beijing (CN)

(72) Inventors: Richard Long, Katy, TX (US); Tian Ruan, Katy, TX (US)

(73) Assignees: UOP LLC, Des Plaines, IL (US); China Petroleum & Chemical Corporation, Beijing (CN)

( * ) Notice: Subject to any disclaimer, the term of this patent is extended or adjusted under 35 U.S.C. 154(b) by 472 days.

(21) Appl. No.: 18/040,990

(22) PCT Filed: Sep. 14, 2020

(86) PCT No.: PCT/US2020/050685
§ 371 (c)(1),
(2) Date: Feb. 8, 2023

(87) PCT Pub. No.: WO2022/055509
PCT Pub. Date: Mar. 17, 2022

(65) Prior Publication Data
US 2023/0265028 A1  Aug. 24, 2023

(51) Int. Cl.
*C07C 29/154* (2006.01)
(52) U.S. Cl.
CPC .................. *C07C 29/154* (2013.01)
(58) Field of Classification Search
CPC ....... C07C 29/154; C07C 29/32; C07C 31/08; C07C 31/12; C07C 31/10
See application file for complete search history.

(56) References Cited

U.S. PATENT DOCUMENTS

| | | | |
|---|---|---|---|
| 4,122,110 A | 10/1978 | Sugier et al. | |
| 5,493,064 A | 2/1996 | Vanderspurt et al. | |
| 5,703,133 A | 12/1997 | Vanderspurt et al. | |
| 5,811,602 A | 9/1998 | Vanderspurt et al. | |
| 6,034,141 A * | 3/2000 | Vanderspurt | B01J 23/60 |
| | | | 502/328 |
| 7,834,223 B2 | 11/2010 | Atkins et al. | |
| 8,129,436 B2 | 3/2012 | Tirtowidjojo et al. | |
| 8,921,431 B2 | 12/2014 | Tijm et al. | |
| 9,346,725 B2 | 5/2016 | Wix | |
| 9,718,754 B2 | 8/2017 | Penney et al. | |
| 2020/0039905 A1 | 2/2020 | Long et al. | |

FOREIGN PATENT DOCUMENTS

EP  0034338 A2  8/1981

OTHER PUBLICATIONS

International Search Report from corresponding PCT application No. PCT/US2020/050568 mailed Jun. 4, 2021.
Claure, "Assessing C3—C4 alcohol synthesis pathways over a MgAl oxide supported K/MoS2 catalyst via 13C2-ethanol and 13C2-ethylene co-feeds," Journal of Molecular Catalysis A: Chemical, 2016, 423, 224.
Walter, "Continuous production of higher alcohols from synthesis gas and ethanol using Cs-modified CuO/ZnO/Al2O3 catalysts," Applied Catalysis A: General, 2019, 585, 117150.
Walter, "Effect of the Addition of Ethanol to Synthesis Gas on the Production of Higher Alcohols over Cs and Ru Modified Cu/ZnO Catalysts," Ind. Eng. Chem. Res. 2015, 54, 1452.
Wu, "The mechanism of higher alcohol formation on ZrO2-based catalyst from syngas," Korean J. Chem. Eng., 2015, 32(3), 406.
Luk, "Status and prospects in higher alcohols synthesis from syngas," Chem. Soc. Rev., 2017, 46, 1358.
Claure, "Insight into reaction pathways in CO hydrogenation reactions over K/MoS2 supported catalysts via alcohol/olefin co-feed experiments," Catal. Sci. Technol., 2016, 6, 1957.
Nunan, "Higher alcohol and oxygenate synthesis over cesium-doped CuZnO catalysts", J. Catal., 1989, 116, 195.
Hilmen, "Synthesis of higher alcohols on copper catalysts supported on alkali-promoted basic oxides", Appl. Catal. A 1998, 169, 355.
Majocchi, "Synthesis of short chain alcohols over a Cs-promoted Cu—ZnO—Cr2O3 catalyst", Appl. Catal. A, 1998, 166, 393.
Written Opinion from corresponding PCT application No. PCT/US2020/050568 mailed Jun. 4, 2021.
International Preliminary Report on Patentability from corresponding PCT application No. PCT/US2020/050685, issued on Mar. 7, 2023.
An, "Isobutanol formation mechanism and method to increase its yield in low-carbon alcohol synthesis", J. Fuel Chem. Tech., 1994, 22, 63. (Abstract only is translated).

* cited by examiner

Primary Examiner — Jafar F Parsa

(57) ABSTRACT

A process for the production of propanol and/or isobutanol is disclosed. The process comprises reacting ethanol or propanol with synthesis gas in the presence of an alkali or alkaline earth doped CuMn oxide catalyst under reaction conditions to produce propanol and/or isobutanol. The catalyst may include one or more additional metal oxides as catalyst support.

18 Claims, No Drawings

CATALYSTS FOR ISOBUTANOL SYNTHESIS FROM SYNGAS AND ETHANOL OR PROPANOL

This application is a U.S. National Phase under 35 U.S.C. § 371 of International Application No. PCT/US2020/050685 filed Sep. 14, 2020, which is incorporated herein by reference in its entirety.

BACKGROUND OF THE INVENTION

Isobutanol is considered as a better fuel additive to gasoline to improve combustion efficiency than ethanol. It has relatively higher energy density, and lower volatility compared to ethanol. In addition, it does not readily absorb water from air, preventing the corrosion of engines and pipelines. It also has a higher octane number than ethanol, resulting in less knocking in engines.

As a result, processes for producing isobutanol from ethanol and propanol have been sought. Various processes and catalysts for producing isobutanol have been described. For example, U.S. Pat. No. 9,718,754 discloses a homogeneous process of converting an alcohol and synthesis gas (syngas) to a higher alcohol on a carbonylation catalyst containing Ir, Co or Ru. By "synthesis gas" or "syngas," we mean a mixture of CO, and $H_2$, and in some cases $CO_2$ as well.

U.S. Pat. No. 9,346,725 discloses a process for production of a higher alcohol from a gas comprising $H_2$, CO, $CO_2$, and lower alcohols, comprising a carbon dioxide and optional alkane removal step. A preferred catalyst consists of copper, zinc oxide, and aluminum oxide, optionally promoted with one or more metals selected from alkali metals, basic oxides of earth alkali metals and lanthanides.

U.S. Pat. No. 5,811,602 describes a method in which methanol reacts with ethanol (and/or propanol) to form isobutanol and higher alcohols in the presence of syngas and a light olefin on a noble metal (Pd) supported on Zn—Mn—Zr mixed oxide containing less than 1.0 mol % alkali.

U.S. Pat. No. 5,493,064 discloses an alcohol-coupling process in which methanol reacts with ethanol (and/or propanol) to form higher alcohols in the presence of syngas. The invention is a catalyst containing Pd and alkali exchanged large pore L zeolite, Y zeolite or mordenite.

Claure, "Assessing $C_3$-$C_4$ alcohol synthesis pathways over a MgAl oxide supported K/MoS$_2$ catalyst via $^{13}C_2$-ethanol and $^{13}C_2$-ethylene co-feeds," Journal of Molecular Catalysis A: Chemical, 2016, 423, 224, describes syngas conversion to $C_3$-$C_4$ alcohol pathways over a MgAl oxide supported K/MoS$_2$ catalyst.

Walter, "Continuous production of higher alcohols from synthesis gas and ethanol using Cs-modified CuO/ZnO/Al$_2$O$_3$ catalysts," Applied Catalysis A: General, 2019, 585, 117150, describes the continuous production of higher alcohols from syngas and ethanol on Cs-modified CuO/ZnO/Al$_2$O$_3$ catalysts.

Walter, "Effect of the Addition of Ethanol to Synthesis Gas on the Production of Higher Alcohols over Cs and Ru Modified Cu/ZnO Catalysts," Ind. Eng. Chem. Res. 2015, 54, 1452, reports the addition of ethanol to syngas for production of higher alcohols over Cs- and Ru—Cu/ZnO catalysts.

Wu, "The mechanism of higher alcohol formation on ZrO$_2$-based catalyst from syngas," Korean J. Chem. Eng., 2015, 32 (3), 406, describes a chain growth mechanism for the synthesis of alcohols from carbon monoxide and hydrogen on a CuZnLaZr catalyst.

Luk, "Status and prospects in higher alcohols synthesis from syngas," Chem. Soc. Rev., 2017, 46, 1358, reviews the state of syngas conversion to higher alcohols and describes a variety of catalysts.

Claure, "Insight into reaction pathways in CO hydrogenation reactions over K/MoS$_2$ supported catalysts via alcohol/olefin co-feed experiments," Catal. Sci. Technol., 2016, 6, 1957, describes reaction pathways for higher alcohol synthesis from syngas over K/MoS$_2$ supported on mesoporous carbon (C) and mixed MgAl oxide (MMO).

U.S. Pat. No. 5,703,133 provides a method of making iso-alcohols in two stages. In the first stage, syngas is converted to $C_1$-$C_4$ alcohols on an alkali promoted Cu—Zn—La—Al oxide. In the second stage, $C_1$-$C_3$ alcohols are converted to iso-alcohols on an alkali-doped ZnMnZr oxide with a noble metal.

U.S. Pat. No. 7,834,223 discloses a CuMo catalyst to covert syngas to alcohols in the presence of methanol and methyl acetate, with an optional alkali metal.

U.S. Pat. No. 8,921,431 discloses a process for syngas conversion to mixed alcohols through removing some non-reactive components from the mixed alcohol products and reintroducing part of the non-reactive components into the reactor and interacting the syngas and the catalyst in a wet mode.

U.S. Pat. No. 8,129,436 discloses a process to improve mixed alcohols yield for syngas conversion to higher alcohols through byproducts recycling and removing with a sulfide Co/Mo catalyst.

US 2020/0039905 describes a process for the conversion of synthesis gas to mixed alcohols in a two-step reaction process using heterogeneous catalysts.

Nuan, "Higher alcohol and oxygenate synthesis over cesium-doped CuZnO catalysts", J. Catal., 1989, 116, 195, reports a Cs/CuZnO catalyst for converting ethanol and syngas to isobutanol. The reported isobutanol productivity is 43 g/kg-h under the conditions of 300° C., 76 atm, $H_2$/CO=0.45 and 193 g/kg-h ethanol and space velocity of 3260 h$^{-1}$.

Hilmen, "Synthesis of higher alcohols on copper catalysts supported on alkali-promoted basic oxides", Appl. Catal. A 1998, 169, 355, discloses K/CuMgCeOx and Cs/Cu/ZnO/Al$_2$O$_3$ catalysts for reacting ethanol or propanol with syngas to produce isobutanol. The isobutanol productivity is 13.2 g/kg-h on K/CuMgCeOx catalyst under the conditions of 310° C., 4.5 MPa, 1500 ml/g-h and $H_2$/CO/Ar/C$_3$H$_7$OH=44.5/44.5/0.1/0.5.

Majocchi, "Synthesis of short chain alcohols over a Cs-promoted Cu—ZnO—Cr$_2$O$_3$ catalyst", Appl. Catal. A, 1998, 166, 393, reports a Cs/CuZnCrOx catalyst for ethanol and syngas conversion to isobutanol. Only 9 g/kg-h isobutanol is achieved under the conditions of 295° C., 75 atm, $H_2$/CO=1, 139 g/kg-h ethanol and space velocity of 9000 ml/g-h.

An, "Isobutanol formation mechanism and method to increase its yield in low-carbon alcohol synthesis", J. Fuel Chem. Tech., 1994, 22, 63, reports isobutanol synthesis from syngas and ethanol or propanol on a Cs/ZnCrOx catalyst. 23 g/kg-h isobutanol is reported under the conditions of 390° C., 100 atm, $H_2$/CO=1.9, 160 g/kg-h ethanol and space velocity of 5000 h-1. When the ethanol is replaced with propanol, isobutanol productivity is increased to 69 g/kg-h.

However, the performance on the disclosed catalysts is so low that the process has not been commercialized.

Therefore, there is a need for an improved catalyst for reacting synthesis gas with ethanol or propanol to produce propanol or isobutanol.

DESCRIPTION OF THE INVENTION

The alkali or alkaline earth doped CuMn oxide catalyst which exhibits good propanol and isobutanol synthesis performance in the aldol condensation reaction between syngas and ethanol or propanol. On the catalyst, the Cu is the active metal for dehydrogenation and hydrogenation in the aldol condensation process, while Mn oxide disperses and stabilizes Cu. The alkali or alkaline earth oxides or salts are used for enhancing C—C coupling in the reaction.

The alkali or alkaline earth doped CuMn oxide catalyst may include Cu oxide in an amount of 0.1 wt % to 90 wt %, or 1 wt % to 90 wt %, or 1 wt % to 80 wt %, or 1 wt % to 70 wt %, or 1 wt % to 60 wt %, or 1 wt % to 50 wt %, or 1 wt % to 40 wt %, or 1 wt % to 30 wt %, or 1 wt % to 20 wt %, or 5 wt % to 90 wt %, or 5 wt % to 80 wt %, or 5 wt % to 70 wt %, or 5 wt % to 60 wt %, or 5 wt % to 50 wt %, or 5 wt % to 40 wt %, or 5 wt % to 30 wt %, or 5 wt % to 20 wt %, or 10 wt % to 90 wt %, or 10 wt % to 80 wt %, or 10 wt % to 70 wt %, or 10 wt % to 60 wt %, or 10 wt % to 50 wt %, or 10 wt % to 40 wt %, or 10 wt % to 30 wt %, or 10 wt % to 20 wt %, or 20 wt % to 90 wt %, or 20 wt % to 80 wt %, or 20 wt % to 70 wt %, or 20 wt % to 60 wt %, or 20 wt % to 50 wt %, or 15 wt % to 40 wt %, or 20 wt % to 30 wt %, or 20 wt % to 90 wt %, or 25 wt % to 90 wt %, or 30 wt % to 90 wt %, or 30 wt % to 80 wt %, or 30 wt % to 70 wt %, or 30 wt % to 60 wt %, or 30 wt % to 50 wt %, or 30 wt % to 40 wt %, or 40 wt % to 90 wt %, or 40 wt % to 80 wt %, or 40 wt % to 70 wt %, or 40 wt % to 60 wt %, or 40 wt % to 50 wt %, or 35 wt % to 90 wt %, or 45 wt % to 90 wt %, or 50 wt % to 90 wt %.

The alkali or alkaline earth doped CuMn oxide catalyst may include Mn oxide in an amount of 0.1 wt % to 90 wt %, or 1 wt % to 90 wt %, or 1 wt % to 80 wt %, or 1 wt % to 70 wt %, or 1 wt % to 60 wt %, or 1 wt % to 50 wt %, or 1 wt % to 40 wt %, or 1 wt % to 30 wt %, or 1 wt % to 25 wt %, or 1 wt % to 20 wt %, or 5 wt % to 90 wt %, or 5 wt % to 80 wt %, or 5 wt % to 70 wt %, or 5 wt % to 60 wt %, or 5 wt % to 50 wt %, or 5 wt % to 40 wt %, or 5 wt % to 30 wt %, or 5 wt % to 25 wt %, or 5 wt % to 20 wt %, or 10 wt % to 90 wt %, or 10 wt % to 80 wt %, or 10 wt % to 70 wt %, or 10 wt % to 60 wt %, or 10 wt % to 50 wt %, or 10 wt % to 40 wt %, or 10 wt % to 30 wt %, or 10 wt % to 25 wt %, or 10 wt % to 20 wt %, or 15 wt % to 90 wt %, or 15 wt % to 80 wt %, or 15 wt % to 70 wt %, or 15 wt % to 60 wt %, or 15 wt % to 50 wt %, or 15 wt % to 40 wt %, or 15 wt % to 30 wt %, or 15 wt % to 25 wt %, or 15 wt % to 20 wt %, or 15 wt % to 90 wt %, or 20 wt % to 90 wt %.

By "alkali or alkaline earth doped" we mean that the CuMn oxide catalyst contains an alkali or alkaline earth metal cation. There can be one or more alkali or alkaline earth metal in the alkali or alkaline earth doped CuMn oxide catalyst. The alkali or alkaline earth metal can be incorporated in the catalyst by any suitable method including, but not limited to, impregnation and co-precipitation. When the alkali or alkaline earth metal is impregnated on the CuMn oxide catalyst, the alkali or alkaline earth metal will appear before the CuMn oxide (e.g., Cs (or $Cs_2O$) doped CuMnCr oxide catalyst). When the alkali or alkaline earth metal is co-precipitated with the Cu and Mn oxide precursors, it will appear in the CuMn oxide (e.g., CuMnMgZr oxide). Suitable alkali and alkaline earth metals include Li, Na, K, Rb, Cs, Be, Mg, Ca, Sr, Ba, and combinations thereof. The alkali or alkaline earth metal can be present in an amount of 0.1 wt % to 30 wt %, or 1 wt % to 30 wt %, or 1 wt % to 25 wt %, or 1 wt % to 20 wt %, or 1 wt % to 15 wt %, or 1 wt % to 10 wt %, or 2 wt % to 30 wt %, or 2 wt % to 25 wt %, or 2 wt % to 20 wt %, or 2 wt % to 15 wt %, or 2 wt % to 10 wt %, or 4 wt % to 30 wt %, or 4 wt % to 25 wt %, or 4 wt % to 20 wt %, or 4 wt % to 15 wt %, or 4 wt % to 10 wt %, or 5 wt % to 30 wt % or 5 wt % to 25 wt %, or 5 wt % to 20 wt %, or 5 wt % to 15 wt %, or 5 wt % to 10 wt %, or 10 wt % to 30 wt %, or 10 wt % to 25 wt %, or 10 wt % to 20 wt %, or 10 wt % to 15 wt % or 15 wt % to 30 wt %, or 15 wt % to 25 wt %, or 15 wt % to 20 wt %, or 20 wt % to 30 wt %, or 20 wt % to 25 wt %.

The alkali or alkaline earth doped CuMn oxide catalyst may include a catalyst support comprising one or more additional metal oxides. Suitable additional metal oxides for the catalyst support include, but are not limited to Zn, Cr, Zr, Al, Si, Ti, Ga, Sn, Y and rare earth metals, and combinations thereof. The additional metal oxide for the support can be present in an amount of 0.1 wt % to 95 wt %, or 1 wt % to 95 wt %, or 1 wt % to 90 wt %, or 1 wt % to 80 wt %, or 1 wt % to 70 wt %, or 1 wt % to 60 wt %, or 1 wt % to 50 wt %, or 1 wt % to 40 wt %, or 1 wt % to 30 wt %, or 1 wt % to 25 wt %, or 1 wt % to 20 wt %, or 5 wt % to 95 wt %, or 5 wt % to 90 wt %, or 5 wt % to 80 wt %, or 5 wt % to 70 wt %, or 5 wt % to 60 wt %, or 5 wt % to 50 wt %, or 5 wt % to 40 wt %, or 5 wt % to 30 wt %, or 5 wt % to 25 wt %, or 5 wt % to 20 wt %, or 10 wt % to 95 wt %, or 10 wt % to 90 wt %, or 10 wt % to 80 wt %, or 10 wt % to 70 wt %, or 10 wt % to 60 wt %, or 10 wt % to 50 wt %, or 10 wt % to 40 wt %, or 10 wt % to 30 wt %, or 10 wt % to 25 wt %, or 10 wt % to 20 wt %, or 15 wt % to 95 wt %, or 15 wt % to 90 wt %, or 15 wt % to 80 wt %, or 15 wt % to 70 wt %, or 15 wt % to 60 wt %, or 15 wt % to 50 wt %, or 15 wt % to 40 wt %, or 15 wt % to 30 wt %, or 15 wt % to 25 wt %, or 15 wt % to 20 wt %, or 20 wt % to 95 wt %, or 25 wt % to 95 wt %, or 30 wt % to 95 wt %, or 35 wt % to 95 wt %, or 40 wt % to 95 wt %, or 45 wt % to 95 wt %, or 50 wt % to 95 wt %.

The alkali or alkaline earth doped CuMn oxide catalyst can be made using any suitable method including, but not limited to co-precipitation followed by impregnation, sol-gel, deposition-precipitation and incipient wetness impregnation.

For example, the alkali or alkaline earth doped CuMn oxide catalyst can be made by dissolving precursor compounds of Cu and Mn (and any additional metal oxides) in water. A carbonate or hydroxide is separately dissolved in water. The two solutions are then combined and mixed with stirring to form a solution of mixed metal carbonates or hydroxides. The slurry is filtered, washed with water, dried, and calcined. Finally, the alkali or alkaline earth oxide or salt is impregnated on the solid to generate the catalyst. The alkaline earth oxide can also be co-precipitated with the Cu, Mn and other metal oxides.

Suitable Cu and Mn precursor compounds include, but are not limited to, nitrates, acetates, chlorides, and sulfates. Suitable alkali or alkaline earth precursors include, but are not limited to hydroxides, carbonates, bicarbonates, nitrates, acetates, formates, and phosphates The ethanol or propanol conversion reaction can be a continuous process, a semi-continuous process, or a batch process.

The ethanol or propanol conversion can take place in any suitable type of reactor, such as fixed-bed reactor and fluidized bed reactor.

The reactor may contain a total amount of ethanol or propanol or both in the range of 0.1 mol % to 50 mol %, or 0.5 mol % to 25 mol %, or 2 mol % to 15 mol %, with the balance being synthesis gas.

The synthesis gas typically has a molar ratio of $H_2$ to CO in a range of 5:1 to 1:5, or in a range of 3:1 to 1:3.

Suitable reaction conditions include one or more of: a temperature in a range of 150° C. to 500° C., or 200° C. to 450° C., or 250° C. to 400° C.; a pressure in a range of 0.1 to 30 MPa, or 0.5 to 15 MPa, or 1.0 to 10 MPa; or a gas hourly space velocity in a range of 100 to 500,000, or 1000 to 200,000, or 2000 to 100,000 liters of gas per kg of catalyst per hr (L/kg-h).

The alkali or alkaline earth doped CuMn oxide catalyst provides good performance in the conversion of ethanol and syngas to propanol and isobutanol, and the conversion of propanol and syngas to isobutanol.

Conversion of ethanol ranged from 5 to 100%, while conversion of CO ranged from 5 to 90%. The yield of propanol and isobutanol ranged from 5 to 95%. The propanol and isobutanol productivities were significantly higher than that of the prior art processes, for example 100% increase.

Conversion of propanol ranged from 5 to 100%, while conversion of CO ranged from 5 to 90%. The yield of isobutanol ranged from 5 to 95%. The isobutanol productivities were significantly higher than that of the prior art processes, for example 150% increase.

One aspect of the invention is a process for the production of propanol and/or isobutanol. In one embodiment, the process comprises reacting ethanol or propanol with synthesis gas in the presence of an alkali or alkaline earth doped CuMn oxide catalyst under reaction conditions to produce propanol and/or isobutanol.

In some embodiments, the alkali or alkaline earth doped CuMn oxide catalyst comprises Cu oxide in an amount of 0.1 wt % to 90 wt %, and Mn oxide in an amount of 0.1 wt % to 90 wt %.

In some embodiments, the alkali or alkaline earth doped CuMn oxide catalyst comprises at least one alkali or alkaline earth metal in an amount of 0.1 wt % to 30 wt %.

In some embodiments, the at least one alkali or alkaline earth metal comprises at least one of Li, Na, K, Rb, Cs, Be, Mg, Ca, Sr, or Ba.

In some embodiments, the alkali or alkaline earth doped CuMn oxide catalyst further comprises one or more additional metal oxides.

In some embodiments, the additional metal oxides are present in an amount of 0.1 wt % to 95 wt %.

In some embodiments, the additional metal oxides comprise oxides of at least one of: Zn, Cr, Zr, Al, Si, Ti, Ga, Sn, Y, or rare earth metals or combination thereof.

In some embodiments, the alkali or alkaline earth doped CuMn oxide catalyst comprises an alkali or alkaline earth doped CuMnCr oxide catalyst. In some embodiments, the alkali or alkaline earth doped CuMn oxide catalyst comprises an alkali or alkaline earth doped CuMnZnCr oxide catalyst.

In some embodiments, the alkali or alkaline earth doped CuMn oxide catalyst comprises a Cs doped CuMnZnCr oxide catalyst.

In some embodiments, the ethanol is reacted with the synthesis gas and wherein at least one of: a conversion of the ethanol is at least 5%, or a conversion of CO in the synthesis gas is at least 5%.

In some embodiments, the propanol is reacted with the synthesis gas and wherein at least one of: a conversion of the propanol is at least 5%, or a conversion of CO in the synthesis gas is at least 5%.

In some embodiments, the reaction conditions comprise one or more of: a temperature in a range of 150° C. to 500° C.; a pressure in a range of 0.1 to 30 MPa; or a gas hourly space velocity in a range of 100 to 500,000 liters of gas per kg of catalyst per hr (L/kg-h).

In some embodiments, at least one of: a total amount of ethanol or propanol or both is in a range of 0.1 mol % to 50 mol % with the balance being synthesis gas; or the synthesis gas has a ratio of $H_2$ to CO is in a range of 5:1 to 1:5.

In some embodiments, the alkali or alkaline earth doped CuMn oxide catalyst comprises: 1 wt % to 60 wt % Cu oxide; 1 wt % to 50 wt % Mn oxide; 1 wt % to 20 wt % of the at least one alkali or alkaline earth metal; and 1 wt % to 50 wt % of additional metal oxides.

In some embodiments, the alkali or alkaline earth doped CuMn oxide catalyst comprises an alkali or alkaline earth doped CuMnZnCr oxide catalyst comprising: 5 wt % to 60 wt % Cu oxide; 5 wt % to 40 wt % Mn oxide; 5 wt % to 40 wt % Zn oxide; 2 wt % to 15 wt % of the at least one alkali or alkaline earth metal; and 5 wt % to 30 wt % Cr oxide.

Another aspect of the invention is a process for the production of propanol or isobutanol. In one embodiment, the process comprises: reacting ethanol or propanol with synthesis gas in the presence of an alkali or alkaline earth doped CuMn oxide catalyst under reaction conditions to produce propanol or isobutanol; wherein the alkali or alkaline earth doped CuMn oxide catalyst comprises: 0.1 wt % to 90 wt % Cu oxide; 0.1 wt % to 90 wt % Mn oxide; 0.1 wt % to 30 wt % of the at least one alkali or alkaline earth metal; and 0.1 wt % to 95 wt % of additional metal oxides.

In some embodiments, wherein the alkali or alkaline earth doped CuMn oxide catalyst comprises at least one alkali or alkaline earth metal in an amount of 0.1 wt % to 30 wt %, and wherein the at least one alkali or alkaline earth metal comprises at least one of Li, Na, K, Rb, Cs, Be, Mg, Ca, Sr, or Ba.

In some embodiments, the alkali or alkaline earth doped CuMn oxide catalyst further comprises 0.1 wt % to 95 wt % of the additional metal oxides, wherein the additional metal oxides comprise oxides of at least one of: Zn, Cr, Zr, Al, Si, Ti, Ga, Sn, Y, or rare earth metals, or combination thereof.

In some embodiments, the ethanol is reacted with the synthesis gas and wherein at least one of: a conversion of the ethanol is at least 5%, or a conversion of CO in the synthesis gas is at least 5%.

In some embodiments, the propanol is reacted with the synthesis gas and wherein at least one of: a conversion of the propanol is at least 5%, or a conversion of CO in the synthesis gas is at least 5%.

In some embodiments, the reaction conditions comprise one or more of: a temperature in a range of 150° C. to 500° C.; a pressure in a range of 0.1 to 30 MPa; or a gas hourly space velocity in a range of 100 to 500,000 liters of gas per kg of catalyst per hr (L/kg-h).

In some embodiments, at least one of: a total amount of ethanol or propanol or both is in a range of 0.1 mol % to 50 mol % with the balance being synthesis gas; or the synthesis gas has a ratio of $H_2$ to CO is in a range of 5:1 to 1:5.

Example 1

3% $Cs_2O/Cu_5Mn_4Cr_1O_{14.5}$ catalyst was prepared with co-precipitation followed by impregnation of Cs.

28.3 g $Cu(NO_3)_2 \cdot 2.5H_2O$, 34.8 g 50% $Mn(NO_3)_2$ solution and 9.9 g $Cr(NO_3)_3 \cdot 9H_2O$ were dissolved in 162 g deionized water in a beaker.

In a separate beaker, 53.5 g $K_2CO_3$ was dissolved in 192 g deionized water.

The two solutions were pumped to a third beaker containing 200 g deionized water at 70° C. with stirring. The pH value of the mixture was kept at 7.0. After the co-precipitation process was complete, the mixture was stirred for an additional one hour.

Subsequently, the slurry was filtered and washed with deionized water three times. The obtained paste was dried at 120° C. for 12 hours and then calcined at 400° C. for 4 hours.

0.7 g $Cs_2CO_3$ was dissolved in 10.9 g deionized water and impregnated on the mixed oxide. The catalyst was dried at 120° C. for 4 hours and calcined at 350° C. for 4 hours.

Example 2

3% $Cs_2O/Cu_5Mn_1Zn_3Cr_1O_{11.5}$ catalyst was prepared with co-precipitation followed by impregnation of Cs.

28.9 g $Cu(NO_3)_2 \cdot 2.5H_2O$, 6.2 g $Mn(CH_3COO)_2 \cdot 4H_2O$, 22.4 g $Zn(NO_3)_2 \cdot 6H_2O$ and 10.1 g $Cr(NO_3)_3 \cdot 9H_2O$ were dissolved in 166 g deionized water in a beaker.

In a separate beaker, 54.6 g $K_2CO_3$ was dissolved in 196 g deionized water.

The two solutions were pumped to a third beaker containing 200 g deionized water at 70° C. with stirring. The pH value of the mixture was kept at 7.0. After the co-precipitation process was complete, the mixture was stirred for an additional one hour.

Subsequently, the slurry was filtered and washed with deionized water three times. The obtained paste was dried at 120° C. for 12 hours and then calcined at 400° C. for 4 hours.

0.7 g $Cs_2CO_3$ was dissolved in 15 g deionized water and impregnated on the mixed oxide. The catalyst was dried at 120° C. for 4 hours and calcined at 350° C. for 4 hours.

Example 3

3% $Cs_2O/Cu_{12}Mn_1Zn_3Cr_1O_{18.5}$ catalyst was prepared with co-precipitation followed by impregnation of Cs.

41.0 g $Cu(NO_3)_2 \cdot 2.5H_2O$, 5.3 g 50% $Mn(NO_3)_2$ solution, 13.2 g $Zn(NO_3)_2 \cdot 6H_2O$ and 6.0 g $Cr(NO_3)_3 \cdot 9H_2O$ were dissolved in 166 g deionized water in a beaker.

In a separate beaker, 53.8 g $K_2CO_3$ was dissolved in 193 g deionized water.

The two solutions were pumped to a third beaker containing 200 g deionized water at 70° C. with stirring. The pH value of the mixture was kept at 7.0. After the co-precipitation process was complete, the mixture was stirred for an additional one hour.

Subsequently, the slurry was filtered and washed with deionized water three times. The obtained paste was dried at 120° C. for 12 hours and then calcined at 400° C. for 4 hours. 0.7 g $Cs_2CO_3$ was dissolved in 14 g deionized water and impregnated on the mixed oxide. The catalyst was dried at 120° C. for 4 hours and calcined at 350° C. for 4 hours.

Example 4

3% $Cs_2O/Cu_5Mn_2Zn_2Cr_1O_{12.5}$ catalyst was prepared with co-precipitation followed by impregnation of Cs.

28.7 g $Cu(NO_3)_2 \cdot 2.5H_2O$, 12.3 g $Mn(CH_3COO)_2 \cdot 4H_2O$, 14.8 g $Zn(NO_3)_2 \cdot 6H_2O$ and 10.0 g $Cr(NO_3)_3 \cdot 9H_2O$ were dissolved in 164 g deionized water in a beaker.

In a separate beaker, 54.3 g $K_2CO_3$ was dissolved in 194 g deionized water.

The two solutions were pumped to a third beaker containing 200 g deionized water at 70° C. with stirring. The pH value of the mixture was kept at 7.0. After the co-precipitation process was complete, the mixture was stirred for an additional one hour.

Subsequently, the slurry was filtered and washed with deionized water three times. The obtained paste was dried at 120° C. for 12 hours and then calcined at 400° C. for 4 hours.

0.7 g $Cs_2CO_3$ was dissolved in 15 g deionized water and impregnated on the mixed oxide. The catalyst was dried at 120° C. for 4 hours and calcined at 350° C. for 4 hours.

Example 5

3% $Cs_2O/Cu_6Mn_2Mg_3Zr_1O_{15}$ catalyst was prepared with co-precipitation followed by impregnation of Cs.

31.2 g $Cu(NO_3)_2 \cdot 2.5H_2O$, 16.0 g 50% $Mn(NO_3)_2$ solution, 17.4 g $Mg(NO_3)_2 \cdot 6H_2O$ and 8.4 g $ZrO(NO_3)_2 \cdot xH_2O$ were dissolved in 179 g deionized water in a beaker.

In a separate beaker, 56.1 g $K_2CO_3$ was dissolved in 201 g deionized water.

The two solutions were pumped to a third beaker containing 200 g deionized water at 70° C. with stirring. The pH value of the mixture was kept at 7.0. After the co-precipitation process was complete, the mixture was stirred for an additional one hour.

Subsequently, the slurry was filtered and washed with deionized water three times. The obtained paste was dried at 120° C. for 12 hours and then calcined at 400° C. for 4 hours.

0.7 g $Cs_2CO_3$ was dissolved in 8.1 g deionized water and impregnated on the mixed oxide. The catalyst was dried at 120° C. for 4 hours and calcined at 350° C. for 4 hours.

Example 6

The catalyst from Example 1 was tested in a tubular reactor under the conditions of 359° C., 100 atm, 3.0% $C_3H_7OH$, 43.5% $H_2$, 43.5% CO, 10% $N_2$, and gas hourly space velocity of 8,000 ml/g-h.

20% CO conversion and 35% propanol conversion were obtained. The productivities of methanol, ethanol and isobutanol were 343, 24 and 174 g/kg-h, respectively.

Example 7

The catalyst from Example 2 was tested in a tubular reactor under the conditions of 310° C., 100 atm, 3.5% $C_2H_5OH$, 43.25% $H_2$, 43.25% CO, 10% $N_2$, and gas hourly space velocity of 4,000 ml/g-h.

43% CO conversion and 88% ethanol conversion were obtained. The productivities of methanol, propanol and isobutanol were 305, 74 and 85 g/kg-h, respectively. The total productivity of propanol and isobutanol was 159 g/kg-h.

Example 8

The catalyst from Example 2 was tested in a tubular reactor under the conditions of 340° C., 100 atm, 2.7% $C_3H_7OH$, 43.65% $H_2$, 43.65% CO, 10% $N_2$, and gas hourly space velocity of 4,000 ml/g-h.

33% CO conversion and 84% propanol conversion were obtained. The productivities of methanol, ethanol and isobutanol were 214, 9 and 161 g/kg-h, respectively.

Example 9

The catalyst from Example 3 was tested in a tubular reactor under the conditions of 300° C., 100 atm, 3.5%

$C_2H_5OH$, 43.25% $H_2$, 43.25% CO, 10% $N_2$, and gas hourly space velocity of 8,000 ml/g-h.

26% CO conversion and 62% ethanol conversion were obtained. The productivities of methanol, propanol and isobutanol were 670, 233 and 19 g/kg-h, respectively. The total productivity of propanol and isobutanol was 252 g/kg-h.

Example 10

The catalyst from Example 4 was tested in a tubular reactor under the conditions of 366° C., 100 atm, 3% $C_3H_7OH$, 43.5% $H_2$, 43.5% CO, 10% $N_2$, and gas hourly space velocity of 8,000 ml/g-h.

23% CO conversion and 89% propanol conversion were obtained. The productivities of methanol, ethanol and isobutanol were 246, 5 and 378 g/kg-h, respectively.

Example 11

The catalyst from Example 5 was tested in a tubular reactor under the conditions of 337° C., 100 atm, 3.8% $C_2H_5OH$, 43.1% $H_2$, 43.1% CO, 10% $N_2$, and gas hourly space velocity of 8,000 ml/g-h.

28% CO conversion and 70% ethanol conversion were obtained. The productivities of methanol, propanol and isobutanol were 438, 129 and 32 g/kg-h, respectively. The total productivity of propanol and isobutanol was 161 g/kg-h.

The above examples indicate that the disclosed catalysts can convert efficiently ethanol and syngas to propanol and isobutanol, and convert propanol and syngas to isobutanol, under the testing conditions.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A process for the production of propanol and/or isobutanol comprising:
    reacting ethanol or propanol with synthesis gas in the presence of an alkali or alkaline earth doped CuMn oxide catalyst under reaction conditions to produce propanol and/or isobutanol.

2. The process of claim 1 wherein the alkali or alkaline earth doped CuMn oxide catalyst comprises Cu oxide in an amount of 0.1 wt % to 90 wt %, and Mn oxide in an amount of 0.1 wt % to 90 wt %.

3. The process of claim 1 wherein the alkali or alkaline earth doped CuMn oxide catalyst comprises at least one alkali or alkaline earth metal in an amount of 0.1 wt % to 30 wt %.

4. The process of claim 3 wherein the at least one alkali or alkaline earth metal comprises at least one of Li, Na, K, Rb, Cs, Be, Mg, Ca, Sr, or Ba.

5. The process of claim 1 wherein the alkali or alkaline earth doped CuMn oxide catalyst further comprises a catalyst support comprising one or more additional metal oxides.

6. The process of claim 5 wherein the one or more additional metal oxide is present in an amount of 0.1 wt % to 95 wt %.

7. The process of claim 5 wherein the one or more additional metal oxide comprises oxides of one or more of: Zn, Cr, Zr, Al, Si, Ti, Ga, Sn, Y, rare earth metals, and combinations thereof.

8. The process of claim 1 wherein the alkali or alkaline earth doped CuMn oxide catalyst comprises an alkali or alkaline earth doped CuMnCr oxide catalyst.

9. The process of claim 1 wherein the alkali or alkaline earth doped CuMn oxide catalyst comprises an alkali or alkaline earth doped CuMnZn oxide catalyst.

10. The process of claim 1 wherein the alkali or alkaline earth doped CuMn oxide catalyst comprises an alkali or alkaline earth doped CuMnZnCr oxide catalyst.

11. The process of claim 1 wherein the alkali or alkaline earth doped CuMn oxide catalyst comprises a Cs doped CuMnZnCr oxide catalyst.

12. The process of claim 1 wherein the alkali or alkaline earth doped CuMn oxide catalyst comprises an alkali or alkaline earth doped CuMnZr oxide catalyst.

13. The process of claim 1 wherein the alkali or alkaline earth doped CuMn oxide catalyst comprises a CuMnMgZr oxide catalyst.

14. The process of claim 1 wherein the alkali or alkaline earth doped CuMn oxide catalyst comprises a $Cs_2O$ doped CuMnMgZr oxide catalyst.

15. The process of claim 1 wherein the reaction conditions comprise one or more of: a temperature in a range of 150° C. to 500° C.; a pressure in a range of 0.1 to 30 MPa; or a gas hourly space velocity in a range of 100 to 500,000 liters of gas per kg of catalyst per hr (L/kg-h).

16. The process of claim 1 wherein at least one of: a total amount of ethanol or propanol or both is in a range of 0.1 mol % to 50 mol % with the balance being synthesis gas; or the synthesis gas has a ratio of $H_2$ to CO is in a range of 5:1 to 1:5.

17. The process of claim 1 wherein the alkali or alkaline earth doped CuMn oxide catalyst comprises:
    1 wt % to 60 wt % Cu oxide;
    1 wt % to 50 wt % Mn oxide;
    1 wt % to 20 wt % of the at least one alkali or alkaline earth metal; and
    1 wt % to 50 wt % of the one or more additional metal oxides.

18. The process of claim 1 wherein the alkali or alkaline earth doped CuMn oxide catalyst comprises an alkali or alkaline earth doped CuMnZnCr oxide catalyst comprising:
    5 wt % to 60 wt % Cu oxide;
    5 wt % to 40 wt % Mn oxide;
    2 wt % to 15 wt % of the at least one alkali or alkaline earth metal;
    5 wt % to 40 wt % Zn oxide; and
    5 wt % to 30 wt % Cr oxide.

* * * * *